United States Patent
Russell et al.

[15] 3,655,537
[45] Apr. 11, 1972

[54] PROCESS FOR SEPARATING GASES

[72] Inventors: Cornelius R. Russell, West Hartford; Sid Russell, Suffield, both of Conn.

[73] Assignee: United Aircraft Corporation, East Hartford, Conn.

[22] Filed: Nov. 18, 1970

[21] Appl. No.: 90,527

[52] U.S. Cl..................................204/60, 204/212, 204/246, 204/247
[51] Int. Cl.............................................B01k 1/00
[58] Field of Search............................................204/60, 212

[56] References Cited

UNITED STATES PATENTS

| | | | |
|---|---|---|---|
| 1,301,832 | 4/1919 | Gerber | 204/212 |
| 1,543,357 | 6/1925 | Baur | 204/60 X |
| 2,829,092 | 4/1958 | Andrieux et al. | 204/60 |
| 3,085,053 | 4/1963 | Taylor | 204/60 |
| 3,173,849 | 3/1965 | Shearer et al. | 204/60 |

Primary Examiner—John H. Mack
Assistant Examiner—D. R. Valentine
Attorney—Owen J. Meegan

[57] ABSTRACT

A process for removing a gaseous constituent from a gaseous mixture involving contacting a layer of electrolyte with the gaseous mixture and then electrolytically decomposing the gaseous constituent into its component parts.

8 Claims, 2 Drawing Figures

PATENTED APR 11 1972 3,655,537

INVENTORS
SID RUSSELL
CORNELIUS R. RUSSELL
BY Owen J. Morgan
ATTORNEY

PROCESS FOR SEPARATING GASES

BACKGROUND OF THE INVENTION

1. Field of the Invention

The present invention relates to electrochemical processes and particularly to ones in which decomposable gases are absorbed in an electrolyte and subsequently decomposed. More specifically, the present invention relates to the absorption of carbon dioxide admixed in air on a thin film of a fused electrolyte and the subsequent decomposition into carbon and oxygen.

It is frequently very desirable to separate one gaseous component from a gaseous mixture. Carbon dioxide, for example, often becomes admixed with air as a result of breathing. Usually there is no need to separate the carbon dioxide from the air because its quantity is small, relative to the total quantity of air in the atmosphere. When the admixture occurs in a closed system, however, techniques for separating the gases and recycling oxygen frequently become necessary. The separation, electrolysis and recycling becomes even more difficult when a closed system is operated without gravity. Controlling solids and liquids is difficult under these conditions.

2. Description of the Prior Art

As has been mentioned in the U.S. Pat. to Russell et al, No. 3,463,209, certain alkali metals, particularly lithium, electrochemically reduced at the cathode in an electrolyte containing lithium carbonate, react chemically with carbon dioxide in solution to deposit carbon as an adherent layer on the surface of the cathode, returning lithium ions and oxide ions to the electrolyte. When this concept is used with relatively thin adherent films of a fused electrolyte, then the system can be operated where there is no gravity.

In the overall process, three main steps occur:

1. Cathode reaction: $CO_3^{2-} + 4e \rightarrow C + 3O^{2-}$
2. Anode reaction: $2O^{2-} \rightarrow O_2 + 4e$
3. Scrubbing reaction: $CO_2 + O^{2-} \rightarrow CO_3^{2-}$ Stated as an overall reaction: $CO_2 \rightarrow C + O_2$

SUMMARY OF THE INVENTION

In accordance with the present invention, a continuously recycling layer of fused electrolyte is exposed to a gaseous mixture of a carrier, such as air, and carbon dioxide. The film is first moved to an absorbing position where it contacts the gaseous mixture and reacts with the carbon dioxide to form a carbonate. From the absorbing position, the film is then moved to a cathodic position where the carbonate is broken down into carbon and oxygen ions. The carbon deposits as an adherent coating on the cathode. The electrolyte now enriched in oxygen ions is then moved to the anodic position, where the oxygen ions are discharged to evolve oxygen gas. After the electrolyte passes from the anodic position it is cycled back to the absorbing position where it is used again to remove carbon dioxide entering into the system.

In the preferred embodiment of the present invention, a thin molten layer of the electrolyte is disposed upon a revolving cylindrical scrubber drum. Carbon dioxide-laden air contacts the drum and the $CO_2$ is absorbed into the electrolyte. The drum revolves so that the $CO_2$ enriched electrolyte reaches the cathodic position where the carbon dioxide is decomposed into carbon and oxygen ions. The carbon deposits as a solid on the cathode. As the drum rotates further, the oxygen ions are carried along in the electrolyte to the anodic position where two-thirds of them are discharged to form oxygen gas. The oxygen gas is added to and reconstitutes the air which has been scrubbed of $CO_2$. As the drum continues its rotation, the electrolyte with remaining one-third of the oxygen ions returns to the absorbing position for re-contact with carbon dioxide-laden air and the process repeats.

The anode and the cathode are preferably two revolving drums, however, stationary electrodes can also be used. Moreover, some constructions may be used which include a stationary anode and a drum-type cathode or visa versa. The entire cylindrical drum upon which the electrolyte is disposed is heated to a temperature sufficient to maintain the electrolyte in a molten state.

DESCRIPTION OF THE PREFERRED EMBODIMENTS

Figure 1:
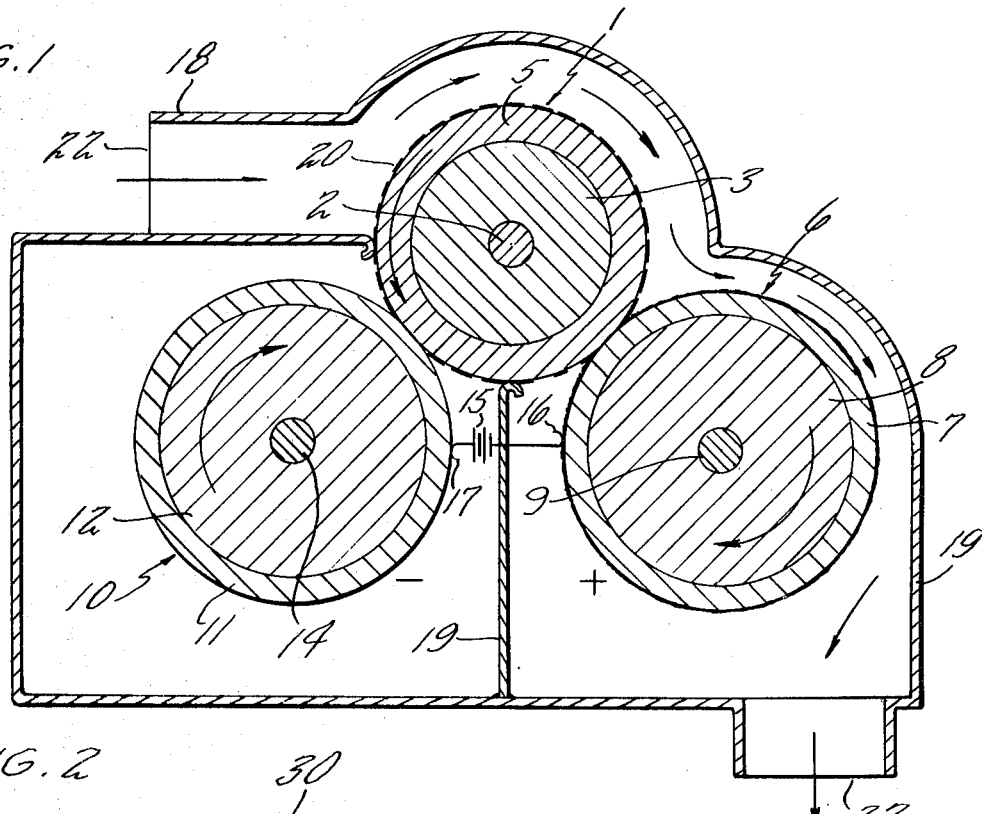
FIG. 1 is a cross-sectional view of one embodiment of the present invention in which cylindrical rollers are used for the anode and the cathode.

Referring to FIG. 1, an axle 2 is centrally disposed within scrubbing drum 1 and is mounted upon slotted holes (not shown) in a housing so that it can revolve freely. The scrubber drum 1 is formed of a tube 5 of a porous refractory ceramic material, such as magnesium oxide with metal end plugs 3 and 15 charged with a reservoir of electrolyte (not shown).

An anode 6 is formed of an electrically conductive cylindrical shell 7 mounted upon a hub 8 with axle 9 centrally disposed therein. A cathode 10 is similar in construction to anode 6 and includes conductive shell 11 mounted upon hub 12 with centrally disposed axle 14. The axles of both the anode 6 and cathode 10 are mounted in slotted holes so that they can rotate freely.

The anode 6 and cathode 10 are connected to opposite sides of a power supply 15 through wiper arms 16 and 17 respectively which contact the surface of the shells. Other suitable element contacts which accomplish the electrolysis can be used also, for example the axles can be connected to the power supply with interconnections to the respective drum surfaces.

The mounting of the cathode 10 is accomplished by placing its axle in holes which will accommodate the gradual buildup of carbon. These holes can be slotted to allow relative outward movement of the cathode from the scrubber while permitting them to bear against each other. Since the rollers are free to move relative to each other, the amount of pressure they exert upon each other is constant.

Movement of the rollers during operation can be accomplished through conventional gearing, (now shown). One or two drums can be driven and the rest can follow or all three can be driven, as desired and depending upon the size of the drums. To provide electrical contact for the anode and cathode, brushes can be fabricated of a suitable metal, arranged to bear upon the surfaces. A positive spring force is preferred, especially one which exerts pressure at the operating temperature of the device. In order to seal the equipment and make all gases flow through the equipment, a pair of spring wiper blades 19 and 21 are provided which brush against the scrubber drum 1.

When operating the equipment, the temperature of the scrubber drum 1 was raised to between 950° and 1,350° F. preferably 1,100° F. The electrolyte became molten and wet the external surfaces of all three drums. A one-half of one percent by volume mixture of $CO_2$ in air was introduced into the scrubber through inlet port 18 at a temperature near about 1,100° F., and a flow rate of 0.0058 lb/minute. The gas flowed through housing 19 and contacted a thin layer 20 of fused electrolyte, 60 Wt% LiCl, 36 Wt% $Li_2CO_3$, 4 Wt% $Li_2O$. The $CO_2$ was scrubbed from the gaseous mixture. A constant current of 3 amperes was applied at 2 to 5 volts to the anode and cathode and carbon was plated upon the cathode 10. Oxygen was produced at the anode 6 and removed from the system with the purified air through port 22.

Figure 2:
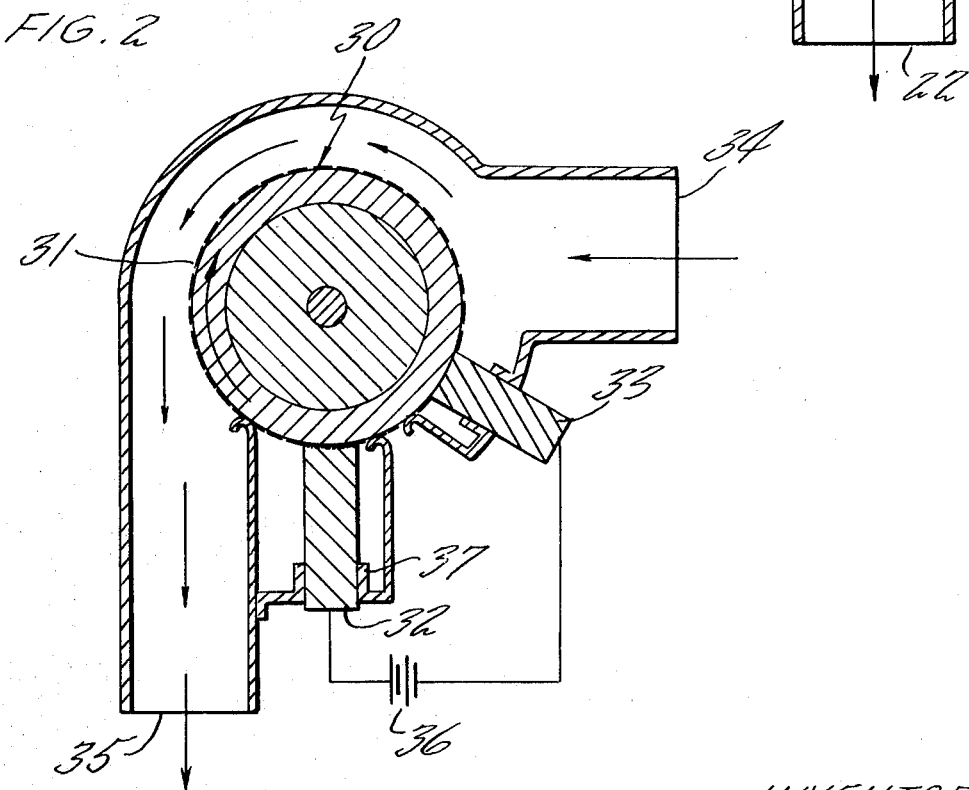
FIG. 2 is a cross-sectional view of another device which can be used for scrubbing $CO_2$ in which the anode and cathode are stationary.

Referring to FIG. 2 another embodiment is shown. The scrubber drum 30 is the same as that described in FIG. 1. In place of counter-rotating anodes and cathodes, however, a pair of spring biased wiper arms or conductors are used. An electrical circuit is made between the layer of fused electrolyte 31 and cathode 32 and anode 33. Gas, laden with $CO_2$, passes into port 34 where it contacts layer 31 and the $CO_2$ is absorbed. The layer 31 is rotated on the drum to the anodic position where it contacts anode 33 and oxygen is released. The oxygen mingles with the incoming air and eventually leaves through port 35. Scrubbing drum 30 revolves from the anodic position to contact the cathode 32 and carbon is plated out thereupon. A potential is established between the anode 33 and cathode 32 by a power supply 36. To compensate for the gradually increasing thickness of carbon on cathode 32, the latter is slowly withdrawn through support 37 by an appropriate indexing device (not shown).

It is apparent that modifications and changes can be made within the spirit and scope of the present invention. It is our intention, however, only to be limited by the scope of the appended claims.

As our invention we claim:

1. In the process of purifying gases, the steps which comprise: flowing a gaseous mixture over a fused layer of absorbent electrolyte whereby at least one of the components of the gaseous mixture will be absorbed therein; moving said layer of electrolyte containing said absorbed gas to a first position while applying one polarity of a potential thereto, whereby the component is decomposed into charged elements, the elements of one charge being attracted to said one polarity of said potential and removed from said electrolyte; subsequently moving the layer of electrolyte to a second position while applying the opposite polarity of said potential thereto whereby oppositely charged elements are attracted to the opposed polarities of said potential and removed from the electrolyte; recycling said electrolyte into contact with said gaseous mixture whereby it will again absorb components of the gaseous mixture.

2. The process according to claim 1 wherein the electrolyte is heated to a temperature of between about 950° and 1,350° F.

3. The process according to claim 1 wherein the gaseous mixture contains carbon dioxide, said carbon dioxide being absorbed by the molten electrolyte and then being decomposed into carbon and oxygen ions at the first position, the oxygen ions then being oxidized to oxygen gas at the second position, the oxygen gas then evolving from the electrolyte and readmixing with the gaseous mixture for recycle.

4. The process according to claim 3 wherein at the first position the electrolyte contacts an anode and oxygen evolves at that point and at the second position the electrolyte contacts a cathode and carbon firmly attaches itself thereupon.

5. The process according to claim 1 wherein the layer of electrolyte is disposed upon a non-conductive cylindrical roller and the one polarity of the potential applied at the first position is implied through a second roller contacting said electrolyte and the opposite polarity of the potential implied at said second position is implied through a third roller contacting said electrolyte.

6. The process according to claim 4 wherein said first roller is an anode and carbon dioxide is absorbed into the electrolyte and oxygen evolves at that point and said second roller is a cathode and carbon deposits thereupon.

7. The process according to claim 1 wherein the layer of electrolyte is disposed upon a non-conductive cylindrical roller and the one polarity of the potential applied at the first position is imposed through an electrode contacting said electrolyte and the opposite polarity of the potential applied at the second position is applied through an electrode contacting said electrolyte.

8. The process according to claim 7 wherein said first electrode is an anode and carbon dioxide absorbed into the electrolyte and oxygen evolves at that point and the second electrode is a cathode and carbon deposits thereupon.

* * * * *

PO-1050
(5/69)

UNITED STATES PATENT OFFICE
CERTIFICATE OF CORRECTION

Patent No. 3,655,537     Dated April 11, 1972

Inventor(s) Cornelius R. Russell, Sid Russell

It is certified that error appears in the above-identified patent and that said Letters Patent are hereby corrected as shown below:

Add the following paragraph to the specification:

-- The invention described herein was made in the performance of work under a NASA contract and is subject to the provisions of Section 305 of the National Aeronautics and Space Act of 1958, Public Law 85-568 (72 Stat. 435; 42 U.S.C. 2457). --

Signed and sealed this 5th day of December 1972.

(SEAL)
Attest:

EDWARD M. FLETCHER, JR.
Attesting Officer

ROBERT GOTTSCHALK
Commissioner of Patents